United States Patent [19]

Singh

[11] Patent Number: 5,446,955

[45] Date of Patent: Sep. 5, 1995

[54] MOLD HEIGHT EXTENSION METHOD

[75] Inventor: A. P. Singh, Akron, Ohio

[73] Assignee: Mitsubishi Heavy Industries America, Inc., New York, N.Y.

[21] Appl. No.: 133,647

[22] Filed: Oct. 8, 1993

[51] Int. Cl.⁶ .............................................. B23P 17/00
[52] U.S. Cl. ..................................... 29/401.1; 74/44; 425/28.1; 100/257
[58] Field of Search ............... 29/401.1; 74/44, 571 M, 74/836; 425/28.1, 34.3, 47; 100/35, 257, 282, 291

[56] References Cited

U.S. PATENT DOCUMENTS

| 3,231,912 | 2/1966 | Meerendonk | 74/44 |
| 4,785,732 | 11/1988 | Czapka et al. | 74/571 M |
| 5,105,684 | 4/1992 | Imanishi | 74/44 X |

*Primary Examiner*—S. Thomas Hughes
*Attorney, Agent, or Firm*—David M. Lowry

[57] ABSTRACT

A method to increase and enhance tire mold height capability of various mechanical tire presses. The method accomplishes mold hold enhancement without imparting appreciable jarring and vibration during press operation. For presses with crank pins pressed into crank gears, the method utilizes removal of the existing crank pin and replacement with an eccentric pin thereby effectively reducing the distance of crank throw by a certain predetermined amount. Side link length is enhanced by a corresponding amount with the result being the repositioning of the press beam by an amount equal to a total of the foregoing. Thereafter, a tire mold of that enhanced height may be accommodated between the beam and base members of the press. In presses with crank pins cast as part of the gears, the method suggests machining off the crank pin from the main body of the crank gear and the boring of an orifice in the gear and the installation of a pin therein, the orifice and pin located so as to provide crank throw equal to the desired crank throw. Further, an increase of side link length of corresponding distance thereby enhances the mold height capability of the mechanical press.

5 Claims, 7 Drawing Sheets

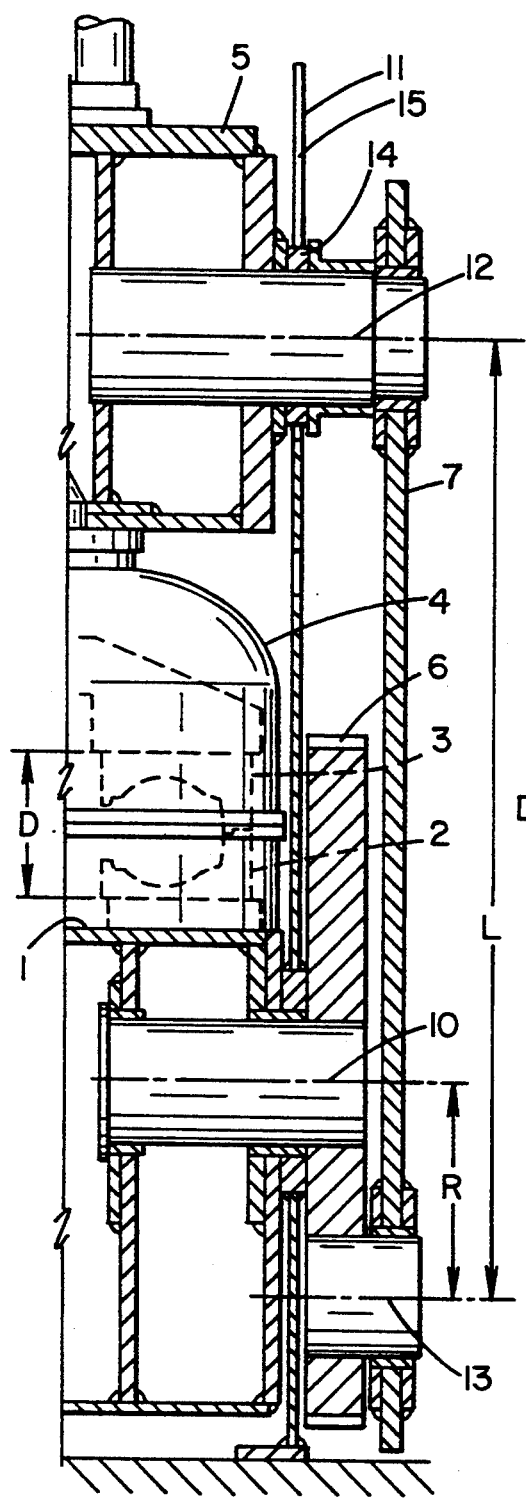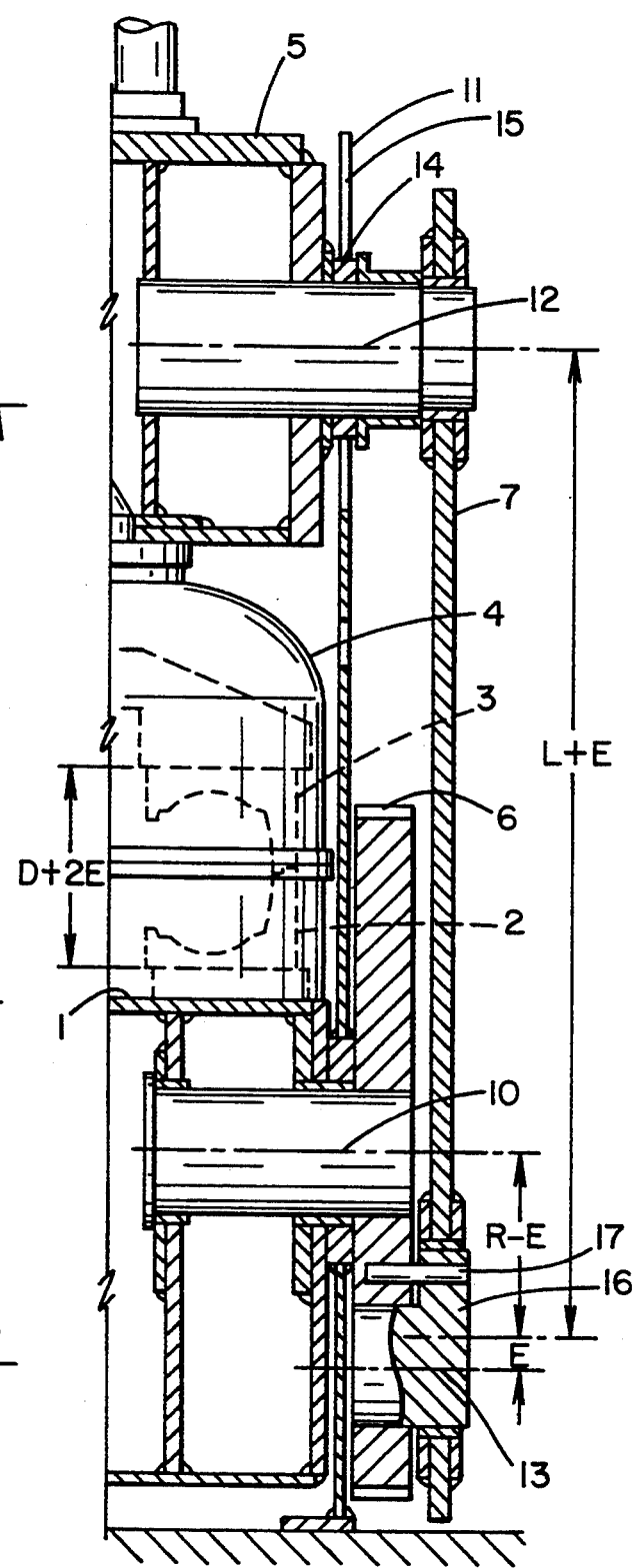

MOLD HEIGHT EXTENSION METHOD

BACKGROUND OF INVENTION

The present invention relates generally to mechanical tire presses and, more particularly, certain methods to enhance their mold height capabilities thereby extending the useful life of the mechanical tire presses.

In common tire presses generally of the "slide back" or "tilt back" types, a loader assembly is utilized to retrieve an uncured or green tire from a loading platform normally located adjacent or proximate to the press. The loader then places the tire on a tire mold or other suitable platform integral with the press and, subsequently, through mechanical operation of the press, a steam dome or other suitable fixture is lowered or placed onto the uncured tire. The enclosed chamber formed thereby is then subjected to heat sufficient to accomplish the vulcanization process.

While the existing mechanical presses may be adequate for the production of various narrow tread design tires, they will not accommodate the wider modern tire configurations. This, specifically, because the necessary height of the molds in which tires are cured has been forced to increase substantially beyond the capability of the existing presses. In the past, a majority of tire manufacturers produced a tire of narrow tread design. These tires were popular and, accordingly, mechanical presses were manufactured with mold height capabilities to coincide with the narrow configuration of these once popular tires. In the present tire market, the low aspect ratio tires of current popularity dictate an increased width of manufactured tires. These older presses are simply not capable of accommodating this enhanced mold height.

Because these mechanical presses are substantial in character and quite expensive, it is desirable to increase the mold height capabilities of the older presses. There have been attempts to accomplish the foregoing through several means. The most common is the simple vertical extension of the side link arm. This, however, poses substantial difficulties from an engineering and operational standpoint. In particular, as the press opens the side link mechanism is no longer in harmony and balance. At its distal operating point, the side link does not slowly decelerate as originally designed. With simple side link extension, the unit continues to accelerate through its normal termination point and, upon stopping, causes substantial and appreciable vibration and component stress. This then ultimately affects loading accuracy because the loading mechanism is normally mounted or affixed on a press beam attached to the side link mechanism. Another method to increase side link length is to change the geometry of the press side plates to maintain original acceleration and deceleration characteristics. Unfortunately, this method is extremely expensive and time consuming as it mandates removal of these large presses from their foundation. This is not only quite expensive, but it causes substantial, and appreciable, manufacturing downtime thereby further increasing the cost of this modification.

It is, accordingly, a principal object of the within to present methods of increasing the mold height capabilities of mechanical curing presses thereby extending their useful life.

It is a further object in the enhancement of mold height capabilities to provide a method whereby a press is not subjected to unusual or unnecessary jarring or vibrational characteristics as a result thereof.

Another important object of the within is to provide a method of mold height enhancement which is economically responsible and feasible and may be accomplished without press removal or substantial and appreciable manufacturing downtime.

SUMMARY OF THE INVENTION

A typical mechanical press incorporates a base member upon which a lower mold unit is mounted. A press beam is driven by crank gears and side links to accomplish vertical and horizontal movements. Attached to the press beam is an upper mold unit. Vertical movements of the press beam clamp the upper and lower mold units together in a "closed" position. To realize an "open" position, movement of crank gears and side links moves the upper mold unit vertical and in the horizontal away from the lower mold unit. It is in this open position that uncured tires are placed upon the lower mold unit. Accordingly, the ultimate horizontal and vertical movements of the press beam are dictated by the physical characteristics of the side link and crank gear mechanisms. The side link is, essentially, a linking arm mechanism affixed to the press beam at one end and the crank gear drive means at the other. In operation, upon rotation of the crank gear, the side link moves correspondingly through its relative range of motion and the upper mold unit, by means of press beam movement, is displaced from its closed position vertically and horizontally into an open position. Following uncured tire loading, reverse operation then returns the press beam and upper mold unit to the closed position.

Almost all mechanical curing presses utilize a crank gear mechanism that naturally decelerates the motion of an upper moving part, normally known generally as the press beam, both at press closed and open positions by stopping the press beam at a point such that the side link is at dead center of the cranking mechanism. This permits a very large closing force on the tire mold in the closed position. This is absolutely necessary in order to withstand the severe internal pressure realized during the vulcanization process. It also then permits deceleration to the final press open position near the dead center of the crank gear mechanism to permit very gentle stopping of the unit. Press open position is also critical for slide back type presses for loading accuracy of uncured tires because the loading mechanism is mounted integral to the press beam. Smooth deceleration, therefore, is very important and critical in order to maintain the accuracy of the loading mechanism. Loaders are integral with the press and load an uncured tire into the press. They consist generally of a loader proper for gripping tires and another device for lifting them. The lifting device is secured to the press beam so as to keep the beam center at a predetermined distance from the loader center, and makes horizontal motions with respect to the press beam. Placement of a tire into a mold is, thereby, accomplished by a loader. Failure to properly place the tire within a mold results in mold misalignment and, ultimately, an irregularly shaped or unrounded tire, or a tire with other manufacturing anomalies. Therefore, it is well recognized that the less jarring and vibration occurring during press operation is more likely to result in a better and more accurately manufactured tire.

As indicated above, modifications to enhance hold height under the prior art result in excessive jarring and vibration during press operation.

Therefore, in furtherance of the foregoing, the instant invention is directed at enhancing mold height capabilities while not increasing vibration or jarring during press operation. To effectuate the foregoing, there is proposed a new and useful method to accomplish mold height enhancement without increasing press vibration or jarring. The methods and concepts are applicable to a plethora of presses including slide back or tilt back types of presses. The method utilizes the removal of the existing crank pin which attaches the side link to the crank gear mechanism. The crank pin is replaced with an eccentric pin. This reduces the original distance of crank throw R by an amount of E to a defined measurement known as $R-E$. Thereafter, the side link is physically lengthened from its original length known as L by an amount of E so that its length is now understood as $L+E$. The result of these modifications is the relocation of the press beam and, therefore, the upper mold unit by an amount of 2E. Consequently, a mold with original height of D may be enhanced to $D+2E$ so as to accommodate the wide body tire configuration heretofore described. As the overall configuration of the side link is not changed by these variations, the press maintains smooth decelerated stops for both closed and open positions by maintaining essentially the same side link positioning. Also, in the open position, the decrease in crank throw as expressed by E is negated by the increase E of side link length thereby enabling the press beam to terminate at its original position while maintaining smooth deceleration motion.

Based upon the foregoing, the desired modifications and, accordingly, the value of E is ultimately a function of the desired enhanced mold height as it is expressed by 2E. As such, once the desired increase in existing mold capabilities is determined, it is a simple calculation to engineer the necessary modifications to side link attachment and length.

The foregoing is specifically demonstrated for presses with crank pins pressed into crank gears and crank pins cast as part of crank gears. While the objects and features of the within invention are specifically distinctly demonstrated for the foregoing types of side link configuration, it will become apparent that the methods hereof are applicable to virtually any press mechanism using a side link and crank gear means to transmit rotary motion into reciprocating motion.

BRIEF DESCRIPTION OF THE DRAWINGS

FIG. 4 is a fragmentary sectional front elevation view demonstrating a mechanical press of the prior art with side link attachment by means of a crank pin pressed into the crank gear;

FIG. 5 is a front elevation view similar to FIG. 4 demonstrating a mechanical press of the present invention including side link attachment by means of a crank pin pressed into the crank gear;

DETAILED DESCRIPTION OF THE DRAWINGS AND PREFERRED EMBODIMENTS

Figure 1:
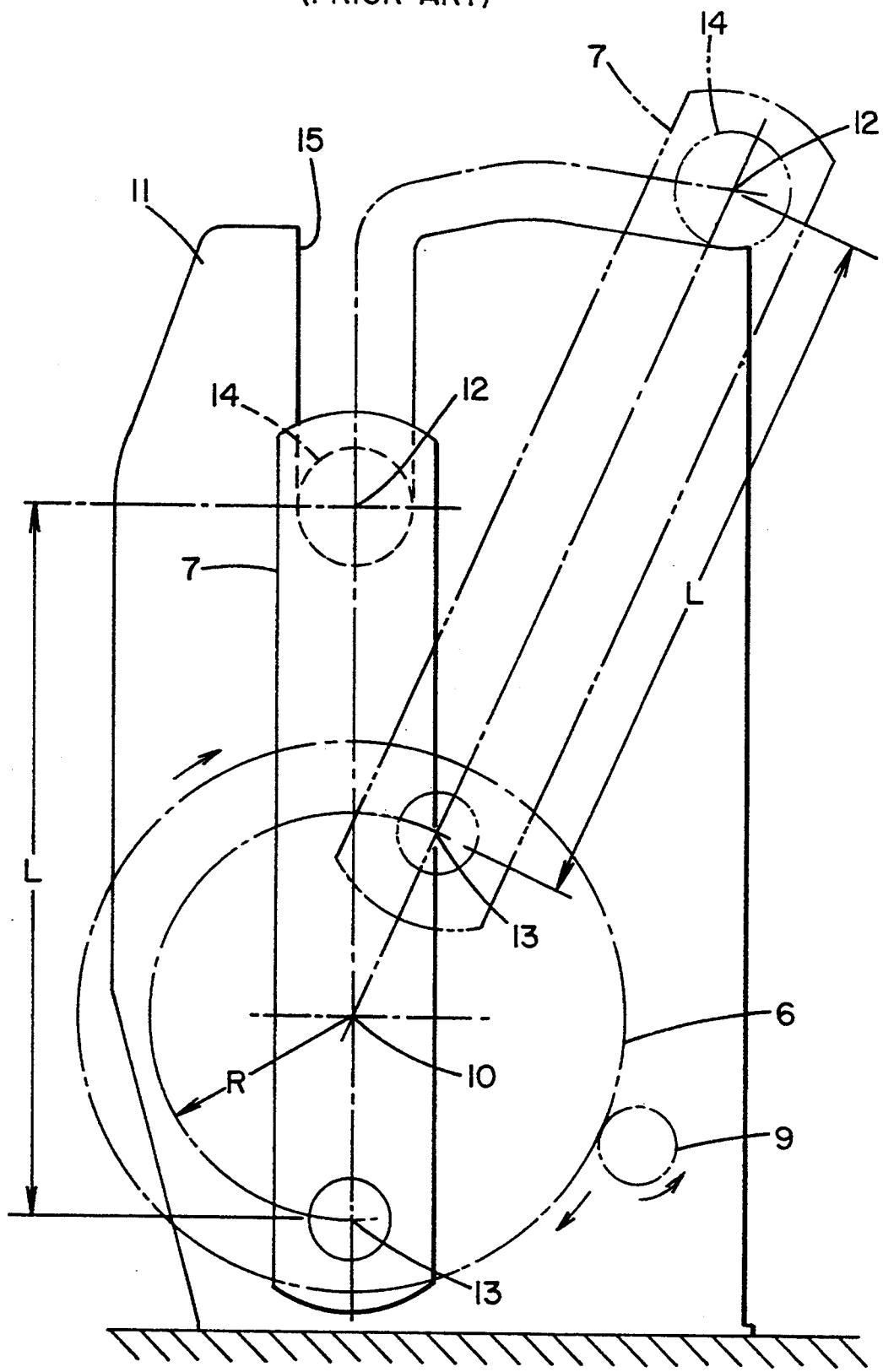
FIG. 1 is a schematic side elevation view of a mechanical tire press demonstrating the prior art. Specifically, the relative location of the side link and crank gear mechanism with crank motion R as the press transverses through the open and closed positions.

As utilized in FIGS. 1 through 8 of the Drawings accompanying this Application, reference character R represents original crank throw measurement as expressed in terms of the distance from absolute center of the crank gear mechanism to center point of side link attachment, character E represents a specific value as determined by a decrease in terms of R realized by the change in the location of side link attachment to the crank gear mechanism, character L represents original side link length, and character D represents the distance between the upper and lower mold units or, correspondingly, the mold height capability of the original press prior to mold height enhancement.

Additionally, as utilized in FIGS. 1 through 8 of the within Description, the formula $R-E$ is utilized as an expression of the distance realized from the center of the crank gear mechanism to side link attachment following decrease by E, formula $L+E$ represents side link length after physical enhancement by length E, and formula $D+2E$ is representative of the distance between the upper and lower mold units following the modifications as described herein or, correspondingly, the height of a mold which may be accommodated therein.

Figure 3:
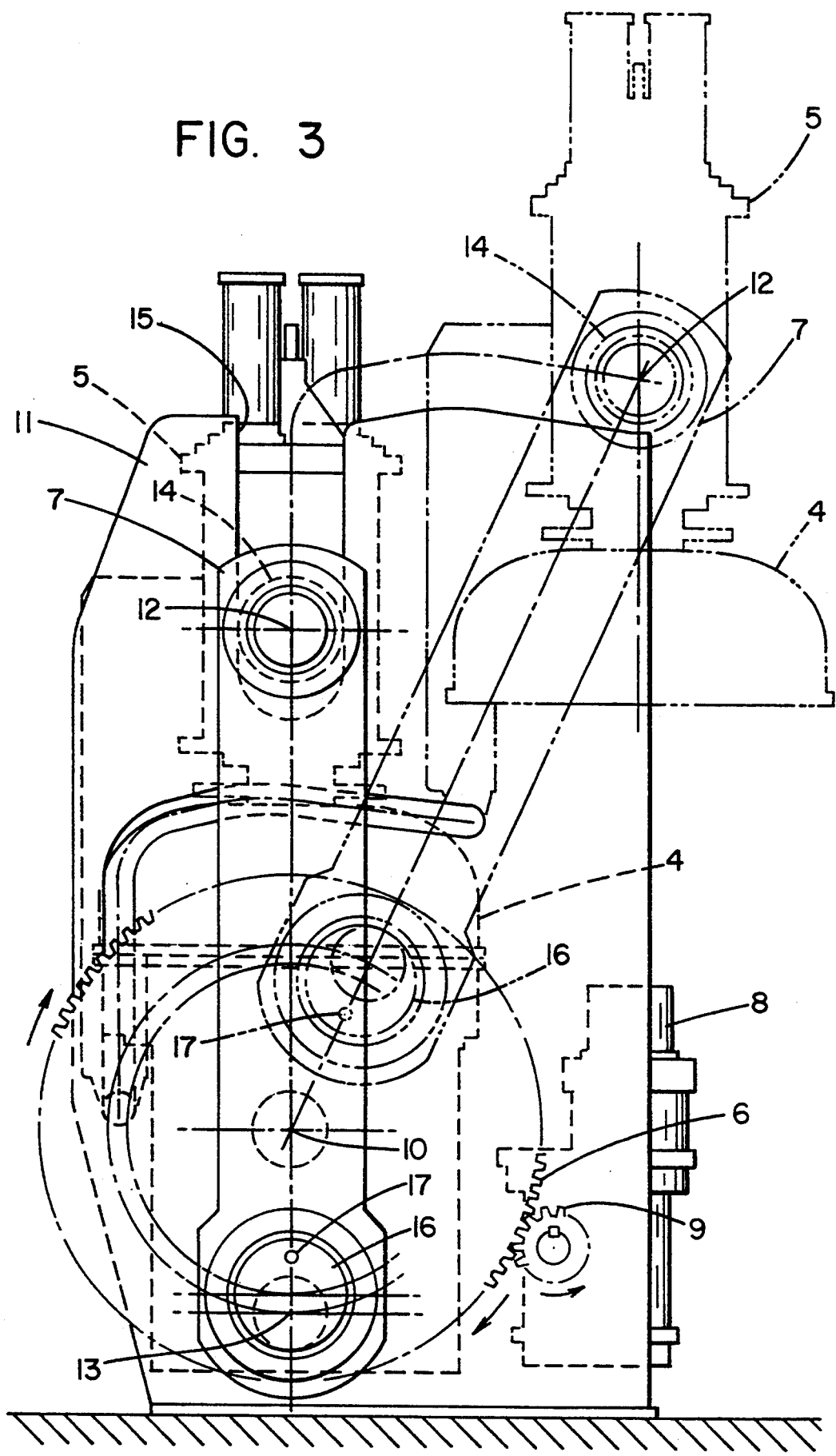
FIG. 3 is a side view of a mechanical tire press in accordance with the embodiment shown in FIG. 2 of the present invention, but with additional detail such as showing the upper mold unit in its open position.

Attention is initially directed to FIGS. 3 and 4 for a generalized description of the operational aspects of a mechanical tire press. The press consists generally of base 1 upon which a lower mold unit 2 is established. The upper mold unit 3 is generally located spatially over the lower mold unit 2 in the closed press position as depicted in FIG. 4. A steam dome 4 is located integral with the upper mold unit 3 and generally defines a heating chamber for the vulcanization process in the closed position. A press beam 5 is driven by crank gear mechanism 6 and side link 7 to accomplish horizontal and vertical movements. The crank gear mechanism 6 is driven by main motor 8 means through crank gear drive unit 9. Said crank gear mechanism 6 rotating upon its axis through crank gear attachment means 10. There is a side plate 11 located on each side of base 1, said side plates and base forming, essentially, the platform upon which the remainder of the press components are attached and supported. Side link 7 is generally attached to press beam 5 by means of side link attachment means 12. The open press position is also depicted in FIG. 3. Specifically, steam dome 4 is visible in its position after moving vertically away from lower mold unit 2 and then horizontally to its most distal operating point. Also, side link 7 is now observable in its relative location at press open position following rotation of crank gear mechanism 6 upon its axis through crank gear attachment means 10.

As a further indication of original press operation, FIG. 1 depicts the side view of a mechanical press as initially manufactured in the prior art. Specifically, a press is shown with crank gear mechanism 6 and side link 7 in its original closed position with side link 7 in the vertical position. As the press operates, crank gear mechanism 6 rotates to its most distal operating point. The foregoing are representative of press closed and open positions, respectively. The press as shown in FIG. 1 has a side link 7 of length L and side link 7 attachment center point at a distant of R from the center of crank gear mechanism 6.

Figure 2:
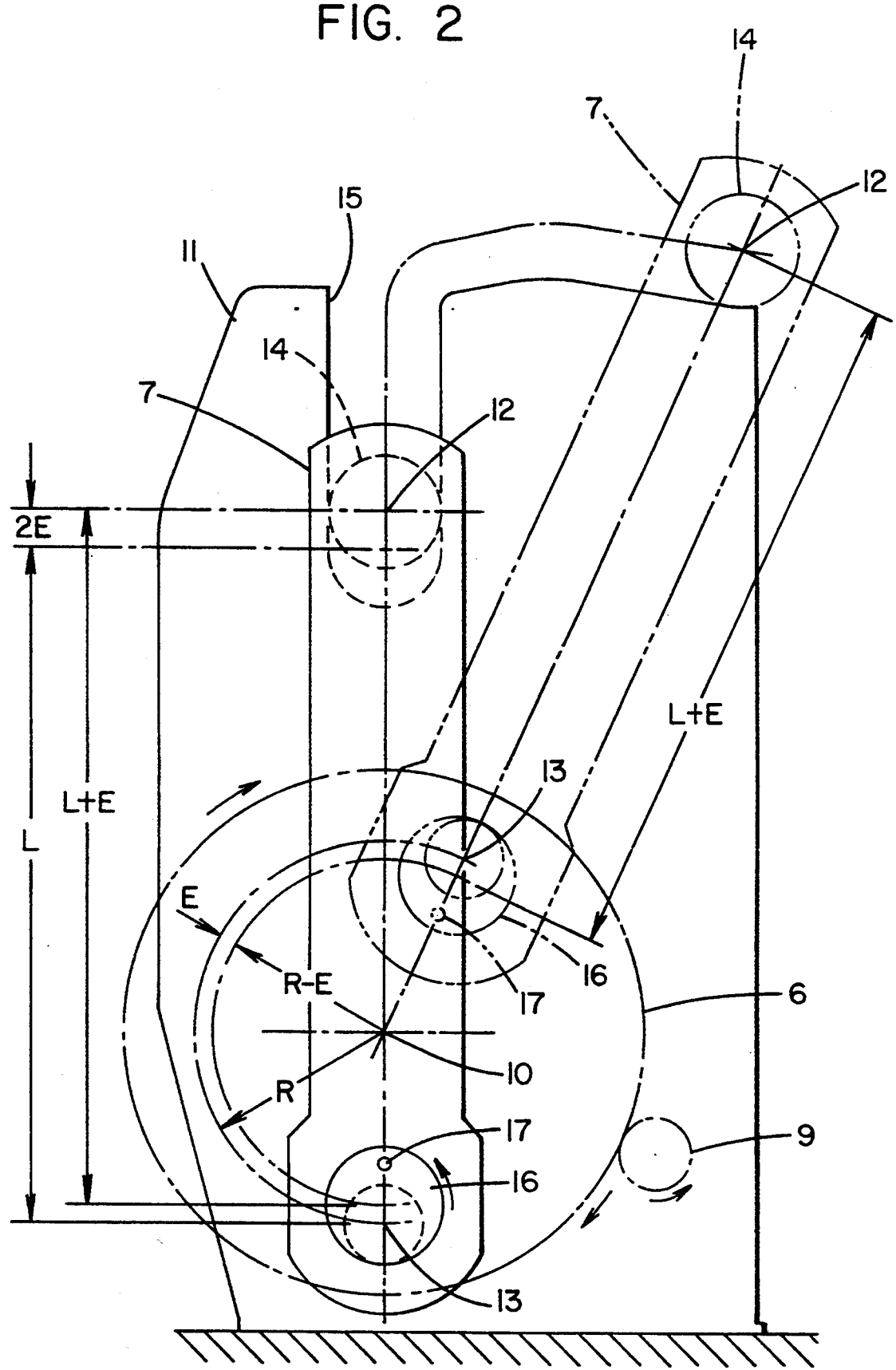
FIG. 2 is a side elevation view similar to FIG. 1 of a mechanical tire press in accordance with the present invention and, more specifically, a press having a side link attachment by means of a pin pressed into the crank gear.

FIG. 2 shows the mechanical press of FIG. 1 now modified in accordance with one preferred embodiment of the instant invention. Note that the geometric and physical modifications as noted in this drawing apply specifically to all presses with side link attachment accomplished by means of crank pins pressed into the crank gear mechanism. FIGS. 4 and 5 are to be considered in conjunction with FIG. 2 and, taken together, depict the preferred embodiment and modifications necessary to presses originally manufactured with these crank pins pressed into a crank gear mechanism.

Referring now specifically to FIG. 2, original crank pin 13 is shown as attaching side link 7 to crank gear mechanism 6. In operation, the original press would travel along R to terminate at its most distal operating point. Through operation, it is seen that follower 14 moves along camtrack 15 to effectuate final open position. Now, with the modifications as proposed in the instant invention, crank pin 13 is removed and replaced with eccentric pin 16. The center of eccentric pin 16 is at a distant R−E from the center of crank gear mechanism 6. Hence, the center of eccentric pin 16 is now a distance of E from the center of original crank pin 13. In conjunction therewith, eccentric pin 16 is further fastened and pinned to crank gear mechanism 6 by means of a dowel pin 17. FIG. 2 properly depicts the new location of the foregoing elements and the geometric modification of same in accordance with the instant invention. In addition to the foregoing, the original press is modified by enhancing physically the length of side link 7 by an amount of E. E being the same amount as the corresponding change in the relative centers of crank pin 13 and eccentric pin 16. In operation, side link 7 moves from its press closed position and travels along R−E to its most distal operating point. Due to the fixed nature of dowel pin 17, eccentric pin 16 essentially rotates upon dowel pin 17. As such, dowel pin 17 represents a fixed position upon which eccentric pin 16 rotates to its relative position as depicted in the press open position. In essence, the rotation of eccentric pin approximately 190 degrees results in an additional net loss of relative press beam 5 height by an amount commensurate with E. Accordingly, the placement of dowel pin 17 must be coordinated so as to be commensurate with the measurements of E as predicated and dictated by the change in relative centers of crank pin 13 and eccentric pin 16 and, ultimately, the desired height enhancement which is a function of D+2E as before described. Therefore, the attachment of side link 7 to a position on crank gear mechanism 6 at a distance of R−E from the center thereof coupled with the placement of dowel pin 17 generates a radius of operation less than original press motion by an amount of E. Further, side link 7 enhancement by a factor of E renders a side link 7 length of L+E. A combination of the foregoing coupled with the rotational characteristics of eccentric pin 16 upon dowel pin 17 yields a modification of press beam 5 height by a factor of 2E in the closed position. Similarly, in the open position, a combination of the foregoing results in the press terminating its most distal operation in the same position as originally manufactured due to crank throw being reduced by an amount equivalent to the enhanced height of side link attachment means 12. The foregoing is even more critically defined when one considers in detail FIGS. 4 and 5. FIG. 4, as previously indicated, demonstrates the mechanical press of prior art. FIG. 4 depicts side link 7 length L and radius R as the distance between crank gear mechanism 6 center and the center of original crank pin 13. FIG. 5 depicts the modifications necessary to the press of FIG. 4 in order to accomplish mold height enhancement. In particular, it can be seen that the relative position of side link 7 with respect to the earth or ground remains static. Side link 7 has been enhanced by an amount of E. Crank pin 13 has been eliminated and replaced with eccentric pin 16 as secured to crank gear mechanism 6 by dowel pin 17. It can now be seen that the effective center of eccentric pin 16 is a distance of R−E from center of crank gear attachment means 10. This renders a difference from the prior art in an amount of E as depicted in FIG. 5. Further, it can now be seen that base 1 is thus now in a position so that lower mold unit 2 and upper mold unit 3 are now effectively separated by a distance of D+2E. Hence, mold height capabilities have been enhanced by an amount of 2E. It is clear that the ultimate determination of the value E is a function of desired mold height. Desired mold height is ascertained by the appropriate modifications to R, dowel pin 17 placement, and side link 7 length increase. All are readily and easily discernable. FIG. 3 teaches the essence of FIG. 2 superimposed upon the mechanical aspects of a mechanical press. Taken as a whole, FIG. 3 depicts the press throughout its range of motion from press closed unto press open position for any particular mechanical press with side link 7 originally attached by means of crank pin 13 pressed into crank gear mechanism 6.

Figure 6:
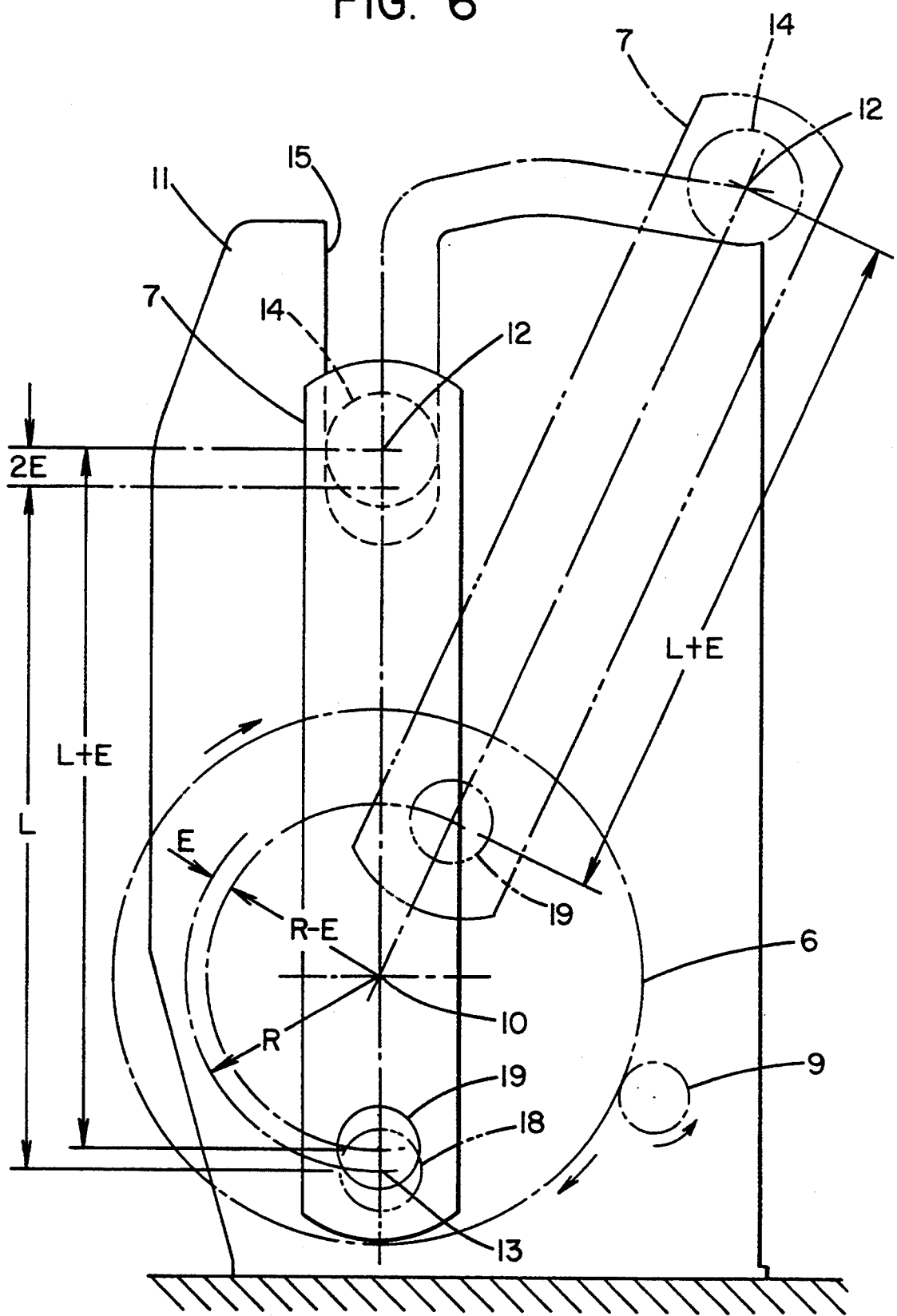
FIG. 6 is a side view similar to FIG. 2 of a mechanical tire press in accordance with one embodiment of the present invention, specifically, a press previously having side link attachment by means of the crank pin cast as part of the crank gear and modified in accordance herewith.
Figure 7:
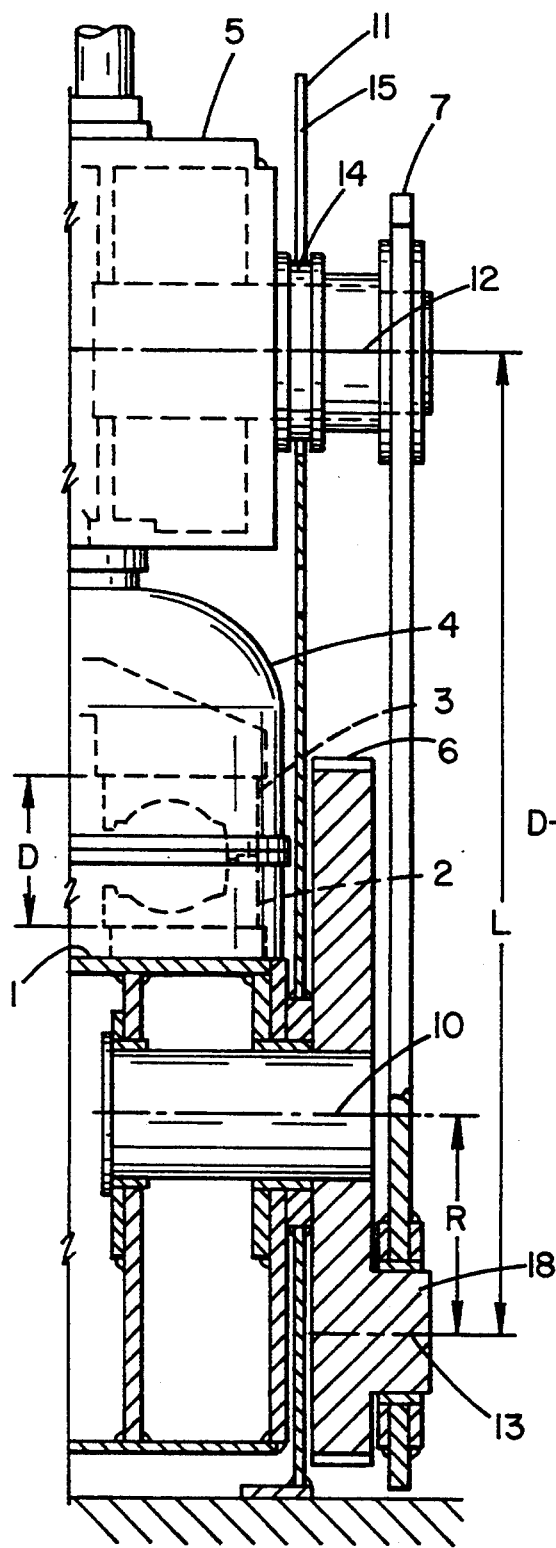
FIG. 7 is a front elevation view similar to FIG. 4 demonstrating the mechanical press of the prior in FIG. 6.
Figure 8:
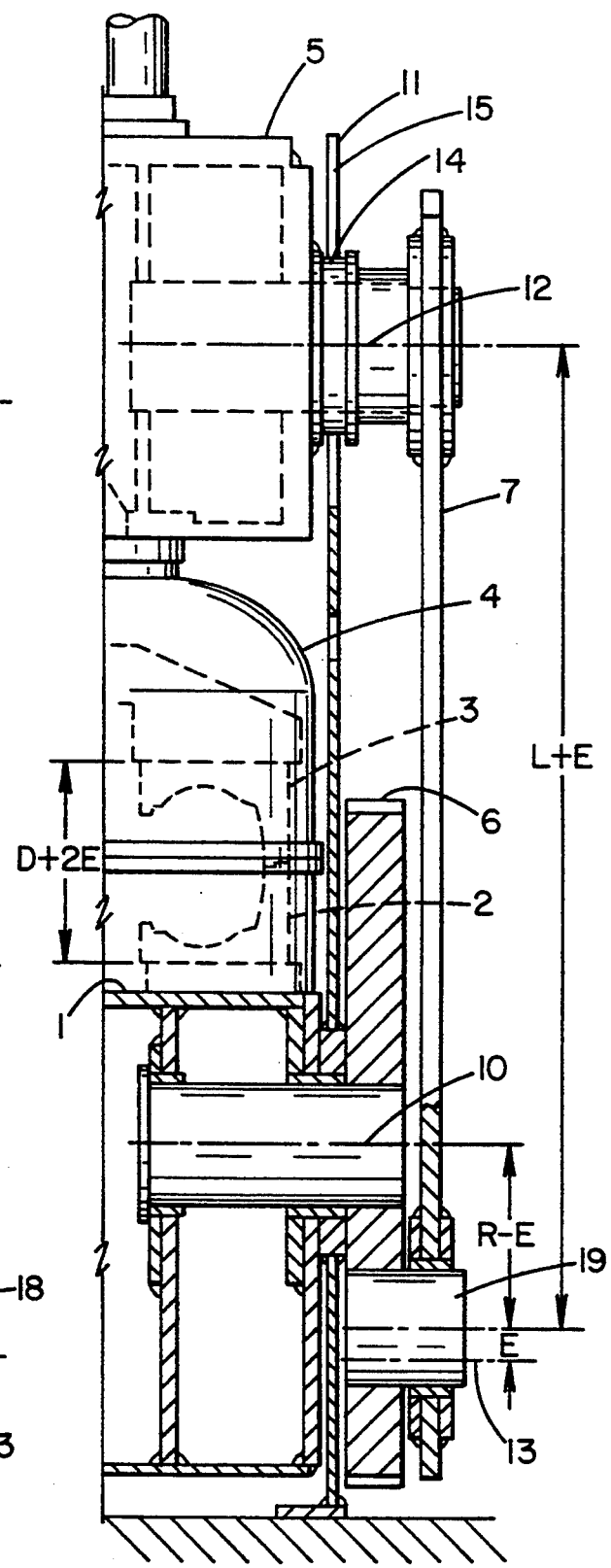
FIG. 8 is a front elevation view similar to FIG. 7 showing modification of a mechanical press of the present invention involving side link attachment by means of a crank pin cast as part of the crank gear mechanism; and, FIG. 9 is a graphic depiction of the press opening characteristics of the press as modified by the present invention.

FIG. 6 is utilized to depict an additional preferred embodiment of the within invention. Specifically, the modifications to a press which is originally manufactured with crank pin attachment means cast as part of a crank gear mechanism. Once again, as in FIG. 2 hereof, a side view of a press through its operational open and closed position is depicted for both the original radius of R and the motion as dictated by R−E after modification to the unit. Crank gear cast pin 18 is easily evident in the aforesaid drawing. Crank gear cast pin 18 is simply an extension of crank gear mechanism 6 in that it was cast as part of the manufacturing process of crank gear mechanism 6. In its original range of motion, side link 7 traverses a course the distance from crank gear mechanism 6 center in an amount of R to its original press open position. In the within modifications, crank gear cast pin 18 is machined or otherwise removed from crank gear mechanism 6 at a point for its entire portion beyond the plane of crank gear mechanism 6. Several methods of machining crank gear cast pin 18 from crank gear mechanism 6 are available and of the prior art. The exact means and method for shearing off crank gear cast pin 18 is not necessarily important as it can be seen that there are several and numerous methods for achieving same. Thereafter, a new hole is bored into crank gear mechanism 6 and a replacement crank gear pin 19 is utilized to attach side link 7 to crank gear mechanism 6. In conjunction therewith, side link. 7 is attached to crank gear mechanism 6 such that it is spatially raised from the earth or floor by an amount of E. This is characteristically accomplished by the continued utilization of the orifice in side link 7 which originally housed original crank gear cast pin 18. It is important to note, as depicted in FIG. 8, that the new position of attachment is predicated by the distance from center of crank gear mechanism attachment means 10 unto the new center of crank gear pin 19 in an amount of R−E or, expressed differently, a change of E. FIG. 8 depicts this modification by an amount of E coupled with the physical enhancement of side link 7 by an amount of E. In operation, prior to side link 7 traversing its range of motion, side link 7 can now be clearly seen in position of raising press beam 5 thereby resulting in the distance of D+2E from lower mold unit 2 unto upper mold unit 3. As the side link 7 operates through its operational parameters along radius R−E, it is now demonstrated that, at its most distal operating point in the open position, it now terminates in the same place as originally manufactured despite the enhancement of 2E in its closed position. This due to the relative decrease in crank throw by an amount corresponding to the enhanced length of side link 7 by an amount of E. Thus, the accomplishment of enhancement in the amount of 2E in the closed position coupled with a press open position equivalant with that originally manufactured accomplishes all of the desired goods of the within invention. Particularly, mold height enhancement without the jarring and vibration which would result from termination of side link attachment means 12 and press beam 5 terminating at a point other than that originally manufactured.

Figure 9:
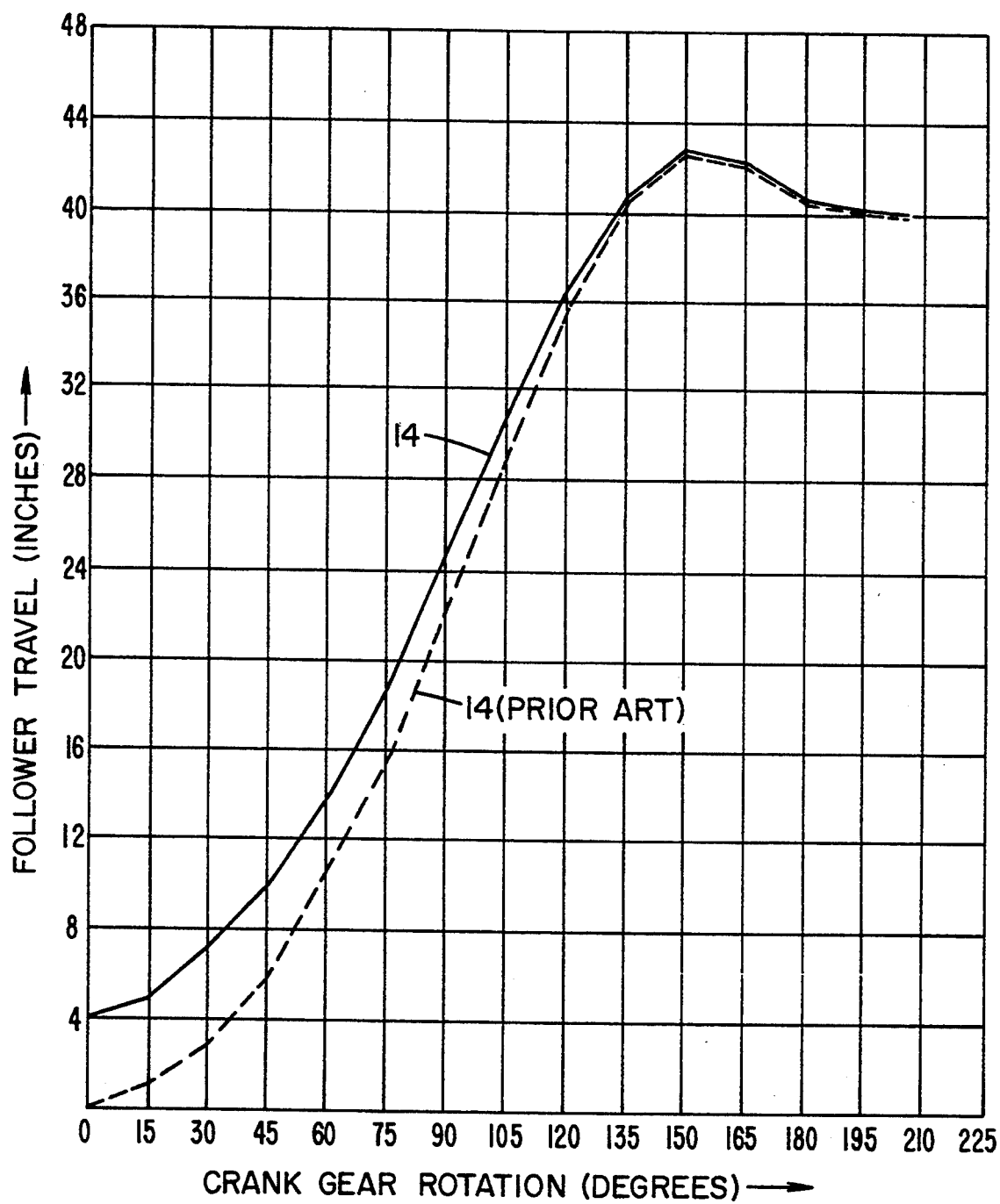

Finally, in an attempt to depict several of the operational aspects of the within claimed invention, FIG. 9 is presented herewith. FIG. 9 depicts, essentially, the travel of follower 14 under prior art and subsequent to modification. It can be seen from the aforesaid figure that certain operational parameters of follower 14 are differed by the aforesaid modification but that, ultimately, side link 7 terminates in the same position as it would prior to modification.

A review of the foregoing will indicate that the foregoing properly and effectively accomplishes mold height enhancement. The modifications in accordance with the within invention therefore, have the following advantageous features:

a. These modifications are applicable to both slide back and tilt back types of presses;

b. The modifications anticipated hereunder require removal of the side links and variances to the crank gear mechanisms. They do not, however, require modifications to the side plates or the press base, beam, or other physical characteristics of a mechanical press. Therefore, the modifications as anticipated hereunder can be performed normally in the manufacturing facility and there is no need to physically remove a mechanical press from its base or foundation in order to accomplish repairs. Additionally, the rather clever and simplistic modifications anticipated hereunder are not as time consuming or product intensive as other means to accomplish the enhancement of mold height currently practiced in the market;

c. Unlike other methods applied to date, the foregoing system maintains a smooth decelerated stop for both closed and open positions of a mechanical press while maintaining the same open and closed positions in the geometric configuration of a crank gear mechanism and side link. A side link follower continues to traverse the existing camtrack thereby reducing and otherwise eliminating unwanted jarring and vibration which is so derogatory to tire loader precision;

This is demonstrated as shown in FIG. 9 of the Drawings forming a part of this Application.

d. The open and closed position mechanical stops inherently manufactured into the mechanical press do not need to be relocated as required in the current practice. This further reduces the cost and time necessary to effectuate modifications under methods being currently utilized in the market. The preferred embodiments as described hereinabove are presented to enable one to clearly understand the principles, concepts, and workings of the within invention. It is clear that the concept, extent and scope of all issues and matters disclosed in the within documents should not be limited to only the preferred embodiments presented herewith. The teachings and concepts as shown in the drawings and other documents should be broadly construed to include equivalent modifications and alterations derived therefrom. Further, it is important to note that the within Description has been specifically set forth for mechanical presses with crank pins cast as part of their existing crank gear and for side links attached by means of crank pins pressed into the crank gear. The teachings demonstrated are essentially and practically capable of being utilized on any mechanical press utilizing a crank gear and side link mechanism to transfer rotary motion into horizontal and vertical motion.

I claim:

1. A method of increasing mold height in a mechanical tire curing press having a side link of predetermined length attached to a crank gear mechanism at a first point to accomplish the transformation of rotary motion into vertical and horizontal motion, comprising:

a. decreasing the distance defined by an existing crank throw in said crank gear mechanism by one-half a desired increase in mold height;

b. increasing the side link length by an amount equal to the decrease in crank throw; and c. combining the decreased distance of crank throw and increased side link length, thereby increasing the mold height by an amount of two times the decrease in crank throw while maintaining a press open position with original acceleration and deceleration characteristics of the mechanical press.

2. The method of claim 1, wherein step c comprises attaching the side link to the crank gear mechanism at a location closer to the center of the crank gear mechanism than said first point, thereby permitting attachment of said side link at a position less than an original radius as defined from the center of the crank gear mechanism to the first point.

3. For a mechanical tire curing press with a side link attached to a crank gear mechanism by means of a crank pin pressed into the crank gear mechanism, a method of increasing mold height, comprising:

a. removing the existing crank pin and replacing it with an eccentric pin located such that the center on the eccentric pin is located at a defined distance of E from the previously existing center of the removed crank pin;

b. vertically elevating the side link by an amount of E; and c. increasing the physical length of the side link by an amount equivalent to E, thereby increasing the tire press mold height by a function of 2E in its closed position while maintaining a press open position with the original acceleration and deceleration characteristics of the mechanical press.

4. The method of claim 3, wherein the replacing step comprises attaching the eccentric pin to the crank gear mechanism by means of a dowel pin, said eccentric pin rotating upon an axis as to the dowel pin as the side link traverses its course between press opened and closed positions.

5. A method of increasing the existing mold height of a mechanical tire curing press, the press having a side link attached to a crank gear by means of a pin cast as part of a crank gear mechanism, comprising:

a. removing the crank gear cast pin for its entire portion beyond a plane defined by the crank gear mechanism;

b. establishing an orifice in the crank gear mechanism at a position such that crank throw will be decreased by a fixed amount;

c. physically increasing the side link length by an amount equal to the amount of decreased crank throw; and d. installing a replacement crank gear pin through the side link and into the orifice located in the crank gear mechanism, thereby establishing a crank throw decreased by an amount equal to the increase in side link length and thus enabling the tire press to stop at its original press open position with the original acceleration and deceleration characteristics of the mechanical press.

* * * * *